United States Patent
Scalzi et al.

(10) Patent No.: US 9,126,244 B2
(45) Date of Patent: Sep. 8, 2015

(54) USE OF ENCAPSULATED SUBSTRATES THAT CONTROL THE RELEASE RATES OF ORGANIC HYDROGEN DONORS

(71) Applicant: Innovative Environmental Technologies, Inc., Pipersville, PA (US)

(72) Inventors: Michael Scalzi, Doylestown, PA (US); Antonis Karachalios, North Wales, PA (US)

(73) Assignee: Innovative Environmental TEchnologies, Inc., Pipersville, PA (US)

( * ) Notice: Subject to any disclaimer, the term of this patent is extended or adjusted under 35 U.S.C. 154(b) by 124 days.

(21) Appl. No.: 13/866,158

(22) Filed: Apr. 19, 2013

(65) Prior Publication Data

US 2014/0311971 A1  Oct. 23, 2014

(51) Int. Cl.
    *B09C 1/10* (2006.01)
    *B09C 1/00* (2006.01)
(52) U.S. Cl.
    CPC .. *B09C 1/10* (2013.01); *B09C 1/002* (2013.01)
(58) Field of Classification Search
    USPC ........................................................ 210/610
    See application file for complete search history.

(56) References Cited

U.S. PATENT DOCUMENTS

| | | | |
|---|---|---|---|
| 6,472,198 B1 * | 10/2002 | Semprini et al. | 435/262.5 |
| 2002/0020665 A1 * | 2/2002 | Sorenson | 210/601 |
| 2004/0043474 A1 * | 3/2004 | Newman | 435/262.5 |
| 2004/0157317 A1 * | 8/2004 | Sorenson et al. | 435/262.5 |
| 2005/0109696 A1 * | 5/2005 | Sorenson, Jr. | 210/610 |
| 2007/0297858 A1 * | 12/2007 | Imbrie | 405/128.45 |
| 2012/0070882 A1 * | 3/2012 | Schaffner et al. | 435/253.6 |
| 2013/0115684 A1 * | 5/2013 | Rittmann et al. | 435/262.5 |

OTHER PUBLICATIONS

Gossett and Zinder, "Microbiological Aspects Relevant to Natural Attenuation of Chlorinated Ethenes", 1997, p. 12-15, EPA/5401R-97/504, Washington, D.C.
Maymo-Gatell et al., "Characterization of an H2-Utilizing Enrichment Culture that Reductively Dechlorinates Tetrachloroethene to Vinyl Chloride and Ethene in the Absence of Methanogensis and Acetogensis", 1995, p. 3928-3933, vol. 61, No. 11, Applied and Environmental Microbiology, New York.
Mohn and Tiedje, "Microbial Reductive Dehalogenation" 1992, p. 482-507, vol. 56, No. 3, Microbiological Reviews, American Society for Microbiology.
Neumann et al., "Tetrachloroethene Metabolism of Dehalospirillum Multivorans", 1994, p. 295-301, vol. 162, Archives of Microbiology.

(Continued)

*Primary Examiner* — Chester Barry
(74) *Attorney, Agent, or Firm* — Douglas J. Ryder; Ryder, Lu, Mazzeo & Konieczny LLC

(57) ABSTRACT

Anaerobic reductive dechlorination processes remove chlorinated solvents from contaminated subsurface soil and ground water. The presence of organic hydrogen donors enables anaerobic microorganisms present in the subsurface soil and groundwater to accelerate the reductive dechlorination process. The present invention provides an alternative method to control the release rate of organic hydrogen donors during dechlorination. The invention utilizes encapsulated substrates to control the release rate of organic hydrogen donors, therefore accelerating the biotic process of anaerobic reductive dechlorination.

17 Claims, 6 Drawing Sheets

(56) References Cited

OTHER PUBLICATIONS

Smatlack et al., "Comparative Kinetics of Hydrogen Utilization for Reductive Dechlorination of Tetrachloroethene and Methanogenesis in an Anaerobic Enrichment Culture", 1996, p. 2850-2858, Environ. Sci. Technol., 30(9), New York.

Wang, "Evaluation of Enhanced Bioremediation for Reductive Dechlorination of Tetrachlorethene (PCE): Microcosm Study", 2000, Virginia Polytechnic Instritute, Blacksburg, Virginia.

Suthersan, Suthan, "Natural and Enhanced Remediation Systems", 2001, CRC Press, LLC, Boca Raton.

* cited by examiner

USE OF ENCAPSULATED SUBSTRATES THAT CONTROL THE RELEASE RATES OF ORGANIC HYDROGEN DONORS

FIELD OF THE INVENTION

The present invention relates to the mediation of subsurface soil and ground water contamination. More specifically, it relates to the introduction in the subsurface of encapsulated fermentable hydrogen donors in order to control the release rates of hydrogen into the solution.

BACKGROUND OF THE INVENTION

Chlorinated solvents are some of the most frequently occurring types of contaminants in soil and groundwater at designated Superfund and other hazardous waste sites in the United States. They are organic compounds that contain chlorine atoms and their properties make them ideal for many industrial-cleaning applications such as degreasing oils and fats. Common solvents include tetrachloroethene (PCE) and trichloroethene (TCE), used extensively in the dry-cleaning industry, and 1,1,1-trichloroethane (TCA) and Methylene Chloride typically used as industrial degreasers.

As shown in FIG. 1, when released into the subsurface, chlorinated solvents tend to sink through the saturated zone as they are denser than water. As a result, small droplets (ganglia) get trapped in the soil 'pore-space' as a non-aqueous phase liquid (NAPL), which can act as a long-term source of dissolved phase contamination. These NAPL source zones can hamper any site remediation effort as they are difficult to treat and detect.

Anaerobic reductive dechlorination is one treatment process that has been successfully used to remediate soil and groundwater contaminated with chlorinated solvents. The occurrence of different types and concentrations of electron donors such as native organic matter and electron acceptors such as oxygen and chlorinated solvents determine which reductive dechlorination occurs during the natural attenuation of a site.

Reductive dechlorination only occurs in the absence of oxygen; chlorinated solvents substitute for oxygen in the physiology of the microorganisms carrying out the process. Remedial treatment technologies usually introduce an oxygen scavenger to the subsurface to ensure this process occurs immediately.

Anaerobic conditions occur when anaerobic bacteria use the chlorinated contaminants as the electron donors and, in most instances, allow the microorganism to derive useful amounts of energy from the reaction. It has been shown that vinyl chloride can be oxidized to carbon dioxide, water, and chloride ion via Fe (III) reduction. Significant anaerobic mineralization of dichloroethene, vinyl chloride, and methylene chloride also has been reported in the literature.

Halorespiration is a type of anaerobic respiration in which a chlorinated compound is used as a terminal electron acceptor. In this reductive dechlorination process, which enables the conservation of energy via electron transport phosphorylation, one or more chlorine atoms are removed and replaced by hydrogen. Halorespiration, also referred to as dehalorespiration, occurs when the organic compound acts as an electron acceptor (primary growth substrate) during reductive dechlorination. During dehalorespiration, the chlorinated organic compounds are used directly by microorganisms (termed "dehalorespirators"), such as an electron acceptor while dissolved hydrogen serves as an electron donor:

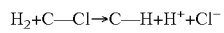

where C—Cl represents the chlorine bond to the carbon in the chlorinated ethene molecule. Dehalorespiration requires not only the presence of competent microorganisms, but also the appropriate quantity and quality of electron donors which serve as the driving force for dehalorespiration. A variety of electron donors have been shown to sustain reductive dechlorination; however, it has only recently been recognized that dissolved hydrogen is the actual electron donor in dehalorespiration (Wang, 2000).

Dehalorespiration occurs as a two-step process which results in the interspecies hydrogen transfer by two distinct strains of bacteria. In the first step, bacteria ferment organic compounds to produce hydrogen. During primary or secondary fermentation, the organic compounds are transformed to compounds such as acetate, water, carbon dioxide, and dissolved hydrogen. Fermentation substrates are either biodegradable nonchlorinated contaminants, or naturally occurring organic carbon. In the second step, the nonfermenting microbial consortia utilize the hydrogen produced by fermentation for dehalorespiration. Although compounds produced during fermentation have been demonstrated to drive dehalorespiration, hydrogen appears to be the most important electron donor for this process.

Dehalorespiration requires sufficient substrates to establish and maintain anaerobic conditions conducive to reductive dechlorination for a period of time and to degrade all unwanted constituents and their daughter products. Common substrates used include acetate, propionate, butyrate, benzoate, glucose, lactate, formate, methanol, toluene, molasses, cheese whey, corn steep liquor, corn oil, hydrogenated cottonseed oil beads, solid food shortening, beef tallow, melted corn oil margarine, coconut oil, soybean oil, and hydrogenated soybean (Sieczkowski, 2012). These compounds serve as the precursors to dissolved hydrogen generation via fermentation. Obligate proton reducers are required to ferment organic substrate present in the subsurface environment to waste products of acetate, formate, dissolved hydrogen, and carbon dioxide (Zehnder, 1988). After fermentation, dissolved hydrogen becomes available for subsequent use by other microorganisms, such as methanogens and dehalorespirators. This syntrophic relationship of hydrogen producers and consumers is known as interspecies hydrogen transfer. Dehalorespiration relies on the presence of fermentable organic substrates that produce dissolved hydrogen.

In addition to the quality of an electron donor, quantity must also be addressed. Since the dissolved hydrogen produced from the fermentation of organic substrates can be used by a variety of microorganisms (e.g. methanogens and dehalorespirators), it is important to consider the competition amongst these microorganisms for dissolved hydrogen when assessing the potential for dehalorespiration (Gossett and Zinder, 1997). Researchers have used the Monod model to examine the uptake of dissolved hydrogen by competing bacteria groups. The Monod model is based on microbial growth under a limiting substrate (e.g. dissolved hydrogen) and is expressed as:

$$\mu = \mu_{max} \frac{S}{K_s + S}$$

where $\mu$ is the specific growth rate, $\mu_{max}$ is the maximum specific growth rate, S is the substrate concentration, and $K_s$ is the half-saturation constant. The parameter $K_s$ gives an indication of how rapidly $\mu$ approaches $\mu_{max}$. A lower $K_s$ suggests that a microorganism will reach its maximum specific growth rate at a lower substrate concentration than another microorganism with a higher $K_s$, and hence are better scavengers when competing for the same limiting substrate.

Smatlak and Gossett (1996) compared the kinetics of dissolved hydrogen use by methanogens and dehalorespirators and obtained Monod-half saturation constants, $K_s$, of approximately 1.0 and 0.1 mM $H_2$ for methanogens and dehalorespirators, respectively. Their results suggest that dehalorespirators are better scavengers for dissolved hydrogen than methanogens, and that the choice of an electron donor that ferments to release dissolved hydrogen at slow, steady, and low levels, such as propionate or butyrate, would favor dehalorespirators over methanogens in the competition for hydrogen (Wang, 2000).

In addition to electron donors, deficiencies of available vitamins and nutrients can also limit dehalorespiration; such nutrients may include organic carbon, nitrogen, phosphorous, amino acids, trace elements, and vitamin $B_{12}$. The complexity of undefined microbial communities makes the understanding of specific nutritional requirements difficult. Yeast extract, a complex substrate, has been shown to increase dechlorination rates to those greater than of simpler substrates. Nutrient amendments to a contaminated aquifer may also benefit reductive dechlorination by stimulating the activity of non-dehalorespirators, which for example, prevent the accumulation of an inhibitory product (Mohn and Tiedje, 1992). Maymo-Gatell et al. (1995) investigated the nutritional requirements of an anaerobic enrichment culture competent at transforming PCE to ethene. Their results suggested that the dehalorespiring culture was dependent on other microorganisms to satisfy some nutritional requirements, and that yeast extract and vitamin $B_{12}$ play roles in dechlorination activity. Vitamin $B_{12}$ was also shown to be a factor in sustaining dehalorespiration by Dehalospirillum multivorans (Neumann et al, 1994). Smatlak and Gossett (1996) measured $K_s$ ($H_2$) values of 100 nM for dehalorespirators and 1,000 nM for methanogens, and suggested that dehalorespirators would out-compete methanogens for electron donors only at low dissolved hydrogen concentrations. This implies that reductive dechlorination by dehalorespirators will be optimal when the amount of available electron donor is low, in order to minimize the direction of electron donors to methanogenesis.

In natural systems, including contaminated aquifers, most $H_2$ becomes available to hydrogenotrophic microorganisms through the fermentation of more complex substrates by other members of the microbial consortium. The dechlorinators must then compete with other organisms, such as methanogens and sulfate-reducing bacteria, for the evolved $H_2$ as best shown in FIG. 2. FIG. 3 also describes the distribution of electrons during the microbial breakdown of organic electron donor substrates (Suthersan, 2001).

Therefore, there is a need in the art for an anaerobic reductive decholorination process that controls the release rate of hydrogen that acts as an electron donor in dehalorespiration through use of encapsulated substrates.

SUMMARY OF THE INVENTION

In order to solve the need in the art for an anaerobic reductive dechlorination process that controls the release rate of hydrogen that acts as an electron donor in dehalorespiration through use of encapsulated substrates, the present invention has been devised.

This invention provides an alternative method to control the release rate of the organic hydrogen donors in the solution during reductive dechlorination remedial process. The newly introduced organic substrates are encapsulated and that way have the potential to control the release of the organic hydrogen donors in the solution. Experimental results are also presented analytically below that show a significant difference in the release rate of calcium ions from the organic hydrogen donor calcium propionate in the solution. Also, as an added benefit, supplemental materials can be added to the process to assist in controlling the pH level of the targeted system. Such materials include, but are not limited to, hydroxides, carbonates, and zero valent metals.

Organic and carbonyl salts have been effectively used as organic hydrogen donors during anaerobic dechlorination process. In fact, calcium propionate has been found to be more effective than other electron donors that produce hydrogen necessary for dehalogenation, such as formate, ethanol, or glucose. The reason is that various groups of microorganisms compete for hydrogen, and that dehalogenating microorganisms can survive better than others at very low hydrogen concentrations. On this basis, slug addition of a compound such as formate, ethanol, or glucose is not as effective for dehalogenation as propionate, because the former compounds are converted rapidly to hydrogen and acetate, and the latter is not. The rapid conversion is a result of more favorable thermodynamics with respect to hydrogen formation. Such rapid conversion places hydrogen in a concentration range where methanogens and sulfate reducers can compete effectively with dehalogenators.

In this respect, before explaining at least one embodiment of the invention in detail, it is to be understood that the invention is not limited in its application and to the arrangements of the components and/or elements set forth in the following description or illustrated in the drawings, diagrams, and tables. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENTS

Figure 1:
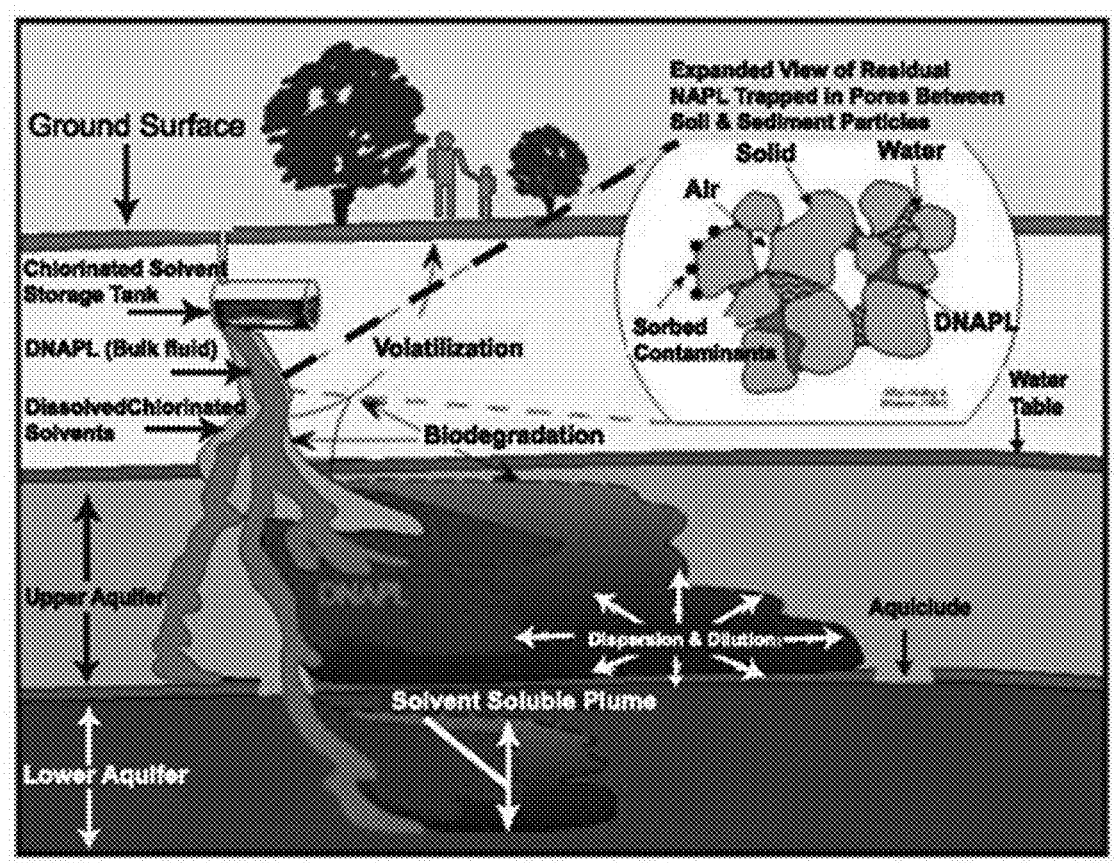
FIG. 1 is a diagram of chlorinated solvent pollution as dense NAPL migrate downward in an aquifer.
Figure 2:
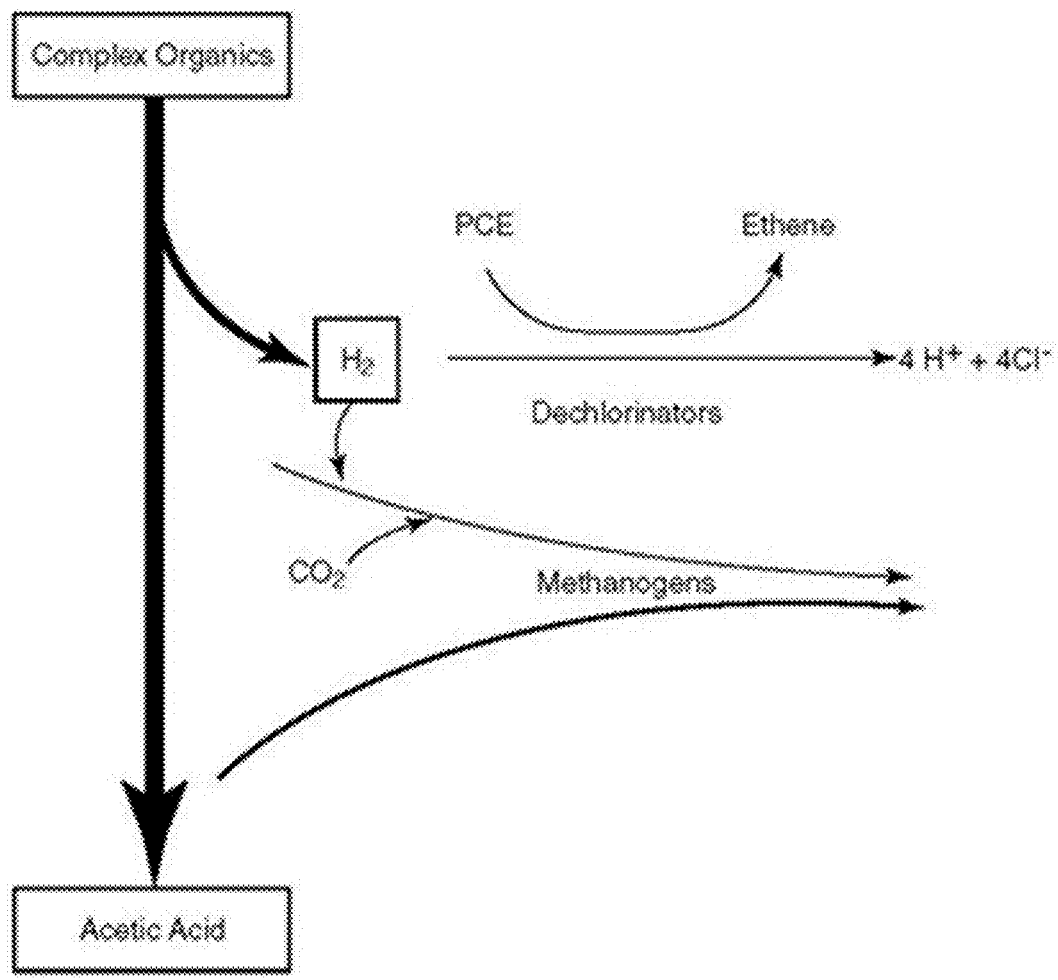
FIG. 2 is an energy diagram of microbial activity.
Figure 3:
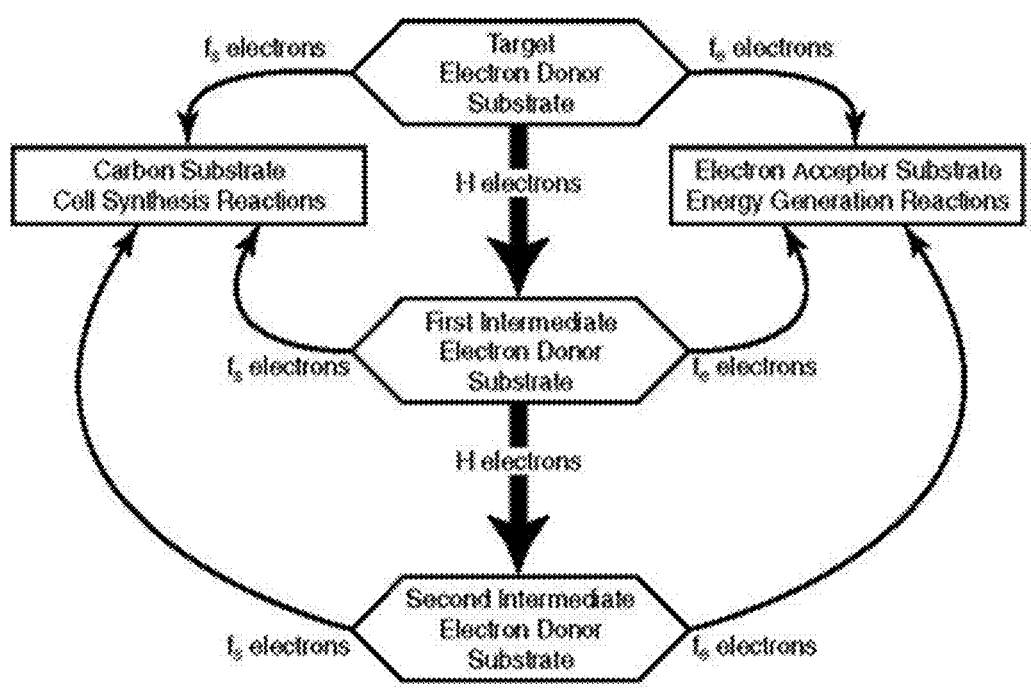
FIG. 3 is a diagram of the distribution of electrons during the breakdown of organic electron donors.
Figure 4:
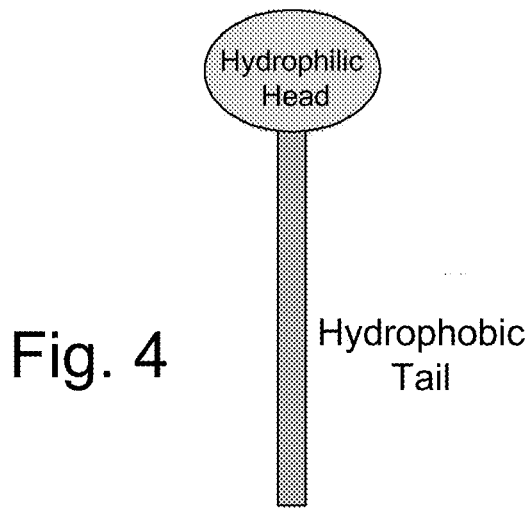
FIG. 4 is a diagram of a basic lipid structure.
Figure 5:
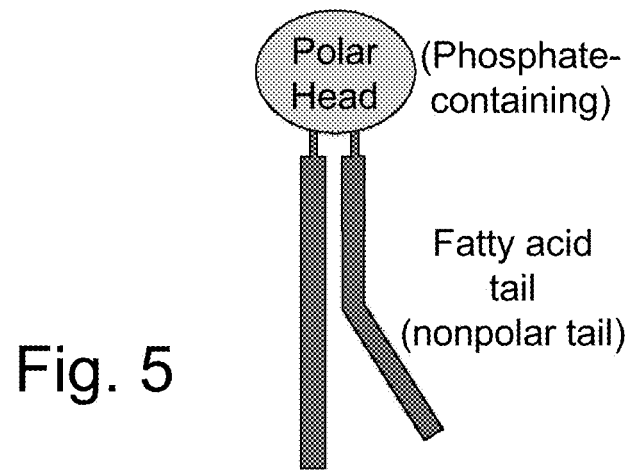
FIG. 5 is a diagram of a phospholipid structure.
Figure 6:
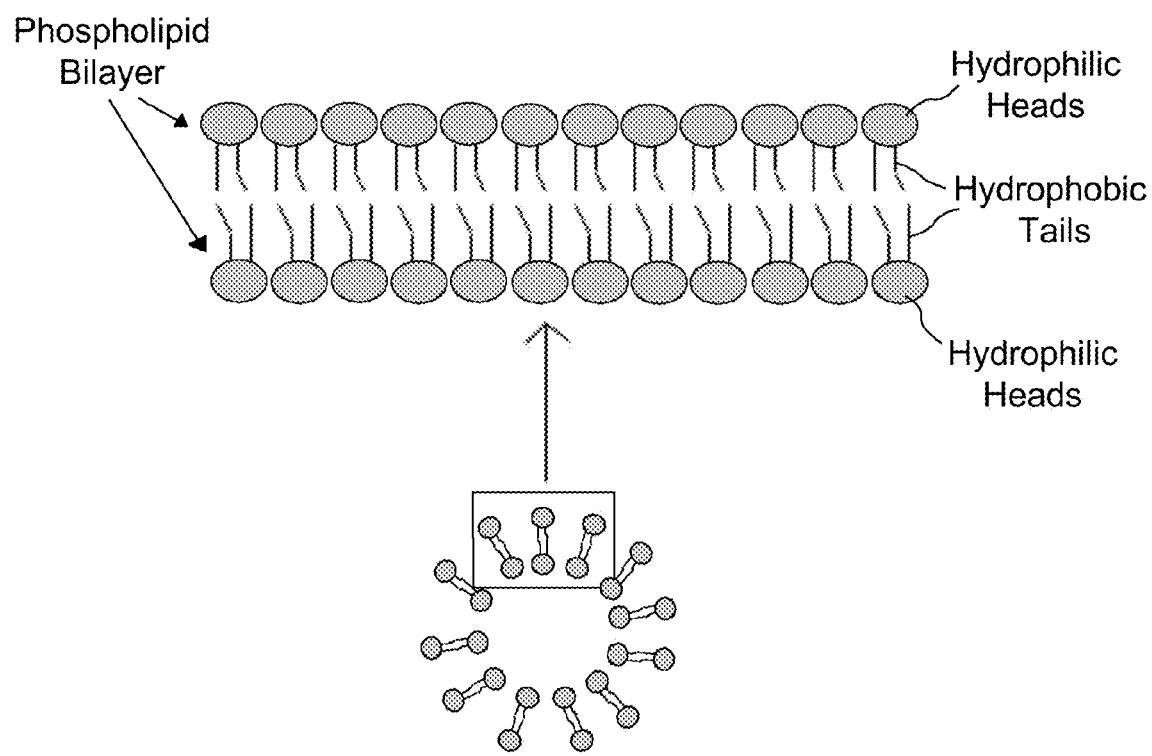
FIG. 6 is a diagram of a lipid bilayer structure.

In the preferred embodiment, a lipid bilayer is the effective encapsulating mechanism. A lipid bilayer is a thin polar membrane composed of two layers of fatty acids organized in two sheets. The lipid bilayer is typically about five to ten nanometers thick and surrounds all cells providing the cell membrane structure. As seen in FIGS. 4 and 5, it forms a continuous barrier around cells and thus provides a semipermeable interface between the interior and exterior of a cell and between compartments within the cell. The cell membrane of almost every living organism is made of a lipid bilayer, as are the membranes surrounding the cell nucleus and other subcellular structures. The lipid bilayer is the barrier that sustains ions, proteins and other molecules and prevents them from diffusing into areas where they should not be. Lipid bilayers are ideally suited to this role because, even though they are only a few nanometers in width, they are impermeable to most water-soluble (hydrophilic) molecules. Referring now to FIGS. 4 and 6, the hydrophobic tails of each individual sheet interacting with one another, a hydrophobic interior is formed and this acts as a permeability barrier. The hydrophilic head groups interact with the aqueous medium on both sides of the bilayer. The two opposing sheets are also known as leaflets. Bilayer-forming lipids are amphipathic molecules (containing both hydrophilic and hydrophobic components). The hydrophilic fragment, typically termed the lipid head-group, is charged, or polar, whereas the hydrophobic section consists of a pair of alkyl chains (typically between 14 and 20 carbon atoms in length) as seen in FIG. 5.

The structure of the lipid bilayer explains its function as a barrier. Lipids are fats, like oil, that are insoluble in water. There are two important regions of a lipid that provide the structure of the lipid bilayer. As seen in FIG. 4, each lipid molecule contains a hydrophilic region, also called a polar head region, and a hydrophobic, or nonpolar tail region. Referring now to FIG. 5, the phospholipid molecule's polar head group contains a phosphate group. It also sports two nonpolar fatty acid chain groups as its tail.

Referring now to FIG. 6, the phospholipids organize themselves in a bilayer to hide their hydrophobic tail regions and expose the hydrophilic regions to water. This organization is spontaneous, meaning it is a natural process and does not require energy. This structure forms the layer that is the wall between the inside and outside of the cell.

Natural bilayers are usually composed of phospholipids. The phospholipid bilayer is the two-layer membrane that surrounds many types of plant and animal cells. It's made up of molecules called phospholipids which arrange themselves in two parallel layers, forming a membrane that can only be penetrated by certain types of substances. This gives the cell a clear boundary, and keeps unwanted substances out; however, it can be damaged and some types of unwanted substances can bypass it.

Figure 7:
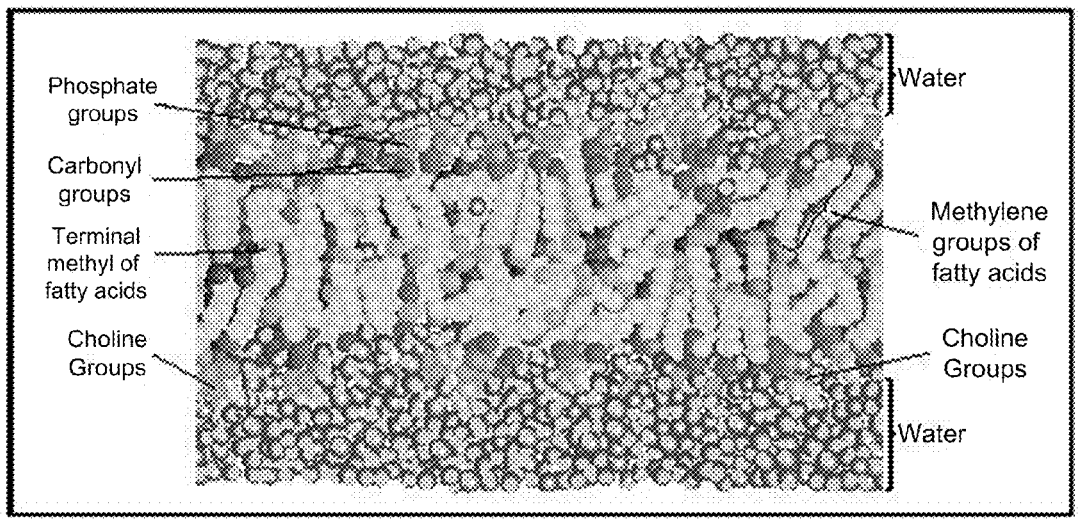
FIG. 7 is a diagram of a lipid dipalmitolyphosphatidylcholine lipid bilayer.

Referring now to FIG. 7, in an aqueous environment the lipids self-assemble into structures that minimize contact between water molecules and the hydrophobic components of the lipids by forming two leaflets (monolayers); this arrangement brings the hydrophobic tails of each leaflet in direct contact with each other, and leaves the head groups in contact with water.

A potential major challenge in in-situ remediation is to engineer structures and materials that can efficiently encapsulate organic hydrogen donors at certain concentration, and controllably release their content at the target site over a specific period of time. In addition to lipid bilayers, encapsulation of the organic hydrogen donor is done with liposomes. In another embodiment, encapsulation is done with dendrimers. In yet another embodiment, encapsulation is done with polymetric organic particles. The controlled release of organic hydrogen donor is introduced into the targeted area via mechanical mixing of soils. When the target area is groundwater, the organic hydrogen donor is introduced via temporary or permanent wells, and is accomplished by gravity feeding, induced gas streams, pumps, or by a combination of these systems. Further, the controlled release of organic hydrogen donor can be introduced into an open excavation prior to backfilling. Encapsulation prevents the species from direct biological interactions and from direct exposure to the environmental conditions that prevail on any given site. Moreover, encapsulating organic hydrogen donors help control their efficiency by controlling their biodistribution and kinetics of release.

Among a wide variety of carriers, lipid-based systems present numerous advantages over other formulations. These carriers are biocompatible, biodegradable and are easily produced by versatile and up-scalable processes. Lipid-based systems have been used for the encapsulation of a wide variety of various agents, while controlling their kinetics of release. The internal physical state of lipid core nanoparticles has been shown to dramatically affect the encapsulation, while maintaining significant prolonged release rates.

Based on all the above, it can be concluded, that due to the existence of the complicated structure of a potential lipid bi/multilayer electron donor, the release rates for the cations and anions in the solution are significantly enhanced and are much slower compared to single layer electron donors.

During in-situ reductive dechlorination the presence of a lipid multilayer compound proves to be very effective since it has the potential of lasting for a longer period of time in the environmental media under anaerobic conditions. At the same time, the encapsulated material also has the potential to decrease the amount of hydrogen provided during the process, which positively affects reductive dechlorination.

This invention presents the data received from a series of experimental procedures that were performed using encapsulated calcium propionate 80% in a distilled monoglyceride matrix. The results of the encapsulated material were compared with those of regular calcium propionate and the release rates of both materials in solution are presented below.

Monoglycerides are among the most promising polar lipid compounds able to bring new or improved functionality to food products since they form self-assembly structures in both lipid and aqueous phases.

Two different dosages (0.5 g/L and 1 g/L) of both the regular calcium propionate (RCP) and the encapsulated 80% calcium propionate (ECP) were tested in order to compare the calcium release rates of both materials. The materials were placed in capped 250-ml flasks and were mixed with the use of magnetic stirring plates. All the experiments were performed in duplicates. As the results in the following table show, ECP showed much slower release rates upon the completion of the 14-day experimental procedure. Note that the table lists data for the calcium release of ECP and RCP during a 2-day and a 14-day experiment.

| Material | Dosage (g/L) | Available calcium (mg/L) | Calcium in Solution (mg/L) | % release in solution |
|---|---|---|---|---|
| 2 DAYS - CAPPED | | | | |
| ECP | 0.5 | 86 | 0 | 0.0 |
| RCP | 0.5 | 107 | 40 | 37.4 |
| ECP | 1 | 171 | 20 | 11.7 |
| RCP | 1 | 214 | 120 | 56.1 |
| 14 DAYS - CAPPED | | | | |
| ECP | 0.5 | 86 | 5 | 5.8 |
| RCP | 0.5 | 107 | 60 | 56.1 |
| ECP | 1 | 171 | 30 | 17.5 |
| RCP | 1 | 214 | 140 | 65.4 |

In fact the 0.5 g/L ECP did not show any release of calcium during the first 2 days of the mixing procedure, while the release was increased to 5.8% of total calcium content 14 days upon the start of the experiment. Similarly the 1 g/L ECP showed a 2-day calcium release of 11.7%, which increased to 17.5% during the 14-day sampling period. Conversely RCP showed much higher calcium release rates in the solution. For the 0.5 g/L RCP the amount of calcium released was at 37.4% after 2 days of mixing and 56.1% after 14 days. For the 1 g/L RCP calcium release was at 56.1% after 2 days and at 65.4% after 14 days.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method for accelerated biotic dechlorination of groundwater and soils based on reductive dechlorination processes comprising encapsulating fermentable organic hydrogen donors in order to control release of said fermentable organic hydrogen donors and stimulate said reductive dechlorination processes.

2. The method of claim 1 wherein said fermentable organic hydrogen donor is a fermentable substrate comprising one material or a combination of materials which when fermented result in dissolved volatile fatty acids.

3. The method of claim 1 wherein said fermentable organic hydrogen donor is an organic salt including acetate, butyrate, formate, lactate, proprionate, and carbohydrates.

4. The method of claim 3 in wherein said organic salt is controllably released and accomplished via an encapsulation of said organic salt.

5. The method of claim 4 wherein said encapsulation of said organic salt is accomplished via liposomes, dendrimers or polymetric organic particles.

6. The method of claim 1 wherein said fermentable organic hydrogen donor is introduced into targeted groundwater via temporary or permanent wells.

7. The method of claim 6 wherein said introduction of said fermentable organic hydrogen donor into the groundwater via temporary or permanent wells is accomplished via gravity feeding, induced gas stream, a pump, or a combination thereof.

8. The method of claim 6 wherein said introduction of said fermentable organic hydrogen donor is accomplished under pressure in either a gas or liquid stream.

9. The method of claim 1 wherein said fermentable organic hydrogen donor is introduced into a targeted area via mechanical mixing of the soils.

10. The method of claim 1 wherein said fermentable organic hydrogen donor is introduced into an open excavation prior to backfilling.

11. The method of claim 1 wherein said reductive dechlorination process is accompanied by additional materials known to further promote a suitable environment of reductive dechlorination.

12. The method of claim 11 wherein said additional materials assist in control of pH.

13. The method of claim 12 wherein said additional materials include hydroxides, carbonates and zero valent metals.

14. The method of claim 11 wherein said additional materials are biologically stimulating agents including vitamins, yeast extract, and biological cultures.

15. A method for accelerated biotic dechlorination of groundwater and soils based on reductive dechlorination processes comprising controlling a release of fermentable organic hydrogen donors by encapsulating said fermentable organic hydrogen donors.

16. The method of claim 15 wherein said fermentable organic hydrogen donors are encapsulated in a lipid bilayer.

17. The method of claim 15 wherein said fermentable organic hydrogen donors are encapsulated using a polar lipid compound.

* * * * *